United States Patent
Naineni

(10) Patent No.: US 7,865,468 B2
(45) Date of Patent: Jan. 4, 2011

(54) PREFETCHING REMOTE FILES ON LOCAL DISK SPACE

(75) Inventor: Malahal R. Naineni, Tigard, OR (US)

(73) Assignee: International Business Machines Corporation, Armonk, NY (US)

(*) Notice: Subject to any disclaimer, the term of this patent is extended or adjusted under 35 U.S.C. 154(b) by 364 days.

(21) Appl. No.: 12/040,332

(22) Filed: Feb. 29, 2008

(65) Prior Publication Data

US 2009/0222453 A1  Sep. 3, 2009

(51) Int. Cl.
 G06F 17/30  (2006.01)
(52) U.S. Cl. .................. 707/636; 707/704; 709/219
(58) Field of Classification Search .......... 707/204–205
 See application file for complete search history.

(56) References Cited

U.S. PATENT DOCUMENTS

| | | | |
|---|---|---|---|
| 5,802,297 A | | 9/1998 | Engquist |
| 5,835,943 A | * | 11/1998 | Yohe et al. ................. 711/118 |
| 5,983,324 A | * | 11/1999 | Ukai et al. ................. 711/137 |
| 7,120,654 B2 | | 10/2006 | Bromley .......................... 1/1 |
| 7,124,258 B2 | | 10/2006 | Nakayama et al. |
| 7,493,642 B2 | * | 2/2009 | Shintani et al. .............. 725/44 |
| 2003/0009538 A1 | * | 1/2003 | Shah et al. .................. 709/219 |
| 2004/0225837 A1 | | 11/2004 | Lewis |
| 2005/0047242 A1 | | 3/2005 | Williams |
| 2006/0174240 A1 | | 8/2006 | Flynn |
| 2006/0200698 A1 | * | 9/2006 | Pillai et al. .................... 714/6 |
| 2008/0222375 A1 | * | 9/2008 | Kotsovinos et al. .......... 711/162 |
| 2008/0306917 A1 | * | 12/2008 | Ishii et al. ..................... 707/3 |
| 2009/0055399 A1 | * | 2/2009 | Lu et al. ..................... 707/10 |

OTHER PUBLICATIONS

P. J. Braam, The Coda Distributed File System, Carnegie Mellon University, School of Computer Science, downloaded from the Internet at URL <http://www.coda.cs.cmu.edu/ljpaper/lj.html> on May 19, 2007, 10 pages.
B. Von Hagen, The Coda Distributed File System for Linux—Hoarding Files for Disconnected Operation, LinuxPlanet at URL <http://www.linuxplanet.com/linuxplanet/tutorials/4481/8/>, Oct. 7, 2002, 3 pages.
B. Von Hagen, The Coda Distributed File System for Linux—Disconnecting From and Reconnecting to the Network, LinuxPlanet at URL <http://www.linuxplanet.com/linuxplanet/tutorials/4481/9/>, Oct. 7, 2002, 3 pages.
G. H. Kuenning et al., Simplfying Automated Hording Methods, MSWiM, Sep. 2002, 7 pages.
Kuenning et al., Experience with an Automated Hoarding System, Sep. 1997, 16 pages.
Kuenning et al. Automated Hoarding for Mobile Computers, Oct. 1997, 22 pages.
Bjorn Gronvall et al., A Multicast-based Distributed File System for the Internet, Feb. 1999, 8 pages.

* cited by examiner

*Primary Examiner*—Debbie Le
(74) *Attorney, Agent, or Firm*—Walter W. Duft

(57) ABSTRACT

A technique for enhancing the transfer of files from a source network host to a destination network host includes accessing a file stored on the source host from the destination host, caching a local copy of the file on the destination host, and prefetching all remaining files in a file system group of which the file is a member by caching local copies thereof on the destination host.

20 Claims, 4 Drawing Sheets

PREFETCHING REMOTE FILES ON LOCAL DISK SPACE

BACKGROUND OF THE INVENTION

1. Field of the Invention

The present invention is directed to file system operations in a computer network. More particularly, the invention concerns the sharing of files maintained by one network host with another network host. Still more particularly, the invention relates to automated file caching methods for transferring files between a source host and a destination host in anticipation of subsequent file accesses or disconnected operation of the destination host.

2. Description of the Prior Art

By way of background, existing network file systems allow data files maintained on one network host (server) to be accessed on another network host (client) over a network. Some network file systems additionally have the capability of caching a local copy of a server file on the client when the file is first accessed from the client. Subsequent file accesses will then be satisfied from the cached copy. File caching increases the speed of subsequent file access and also facilitates disconnected operation of the client because the cached file is available even when the client no longer communicates with the server. File caching additionally entails the ability to synchronize the original file on the server with updates made to the cached local copy at the client. The foregoing file caching features are useful for persons who have a need to work with local files rather than remote files due to network delay, reliability, or connectivity issues. One such scenario is when a worker whose files are stored on a desktop computer or network server at the office desires to work on some of their files at home on a different computer, such as a portable laptop computer.

In order for disconnected operation to be a productive exercise, it is important that all necessary files be transferred to the client prior to disconnection from the server. One way that this can be handled is for a worker to manually select and transfer each required file. However, transferring files individually takes time and may interfere with the person's other duties. Moreover, some files may be inadvertently missed, requiring a subsequent copy operation provided the server is still accessible. If the server is no longer accessible, the absence of a crucial file may require termination of the remote work session. Another option would be to manually copy entire directories or volumes. However, such transfers take time, particularly if the directory or volume is large. Thus, the worker may be delayed while waiting for the transfer to complete.

There are existing network file system mechanisms known as "hoarding" wherein selected files are automatically prefetched from a server and cached onto a client's disk before the client disconnects from the server. The prefetched files will then be available on the client during the disconnection period and local updates to such files can be propagated back to the server upon reconnection. The selection of files that are to be prefetched may be determined automatically using a predictive hoarding algorithm. The predictive hoarding technique attempts to automatically predict the set of files that should be hoarded by monitoring user file access. Predictive hoarding algorithms range from simple LRU (Least Recently Used) caching to techniques that are considerably more complex.

LRU caching algorithms are exemplified by the "Coda" distributed file system developed at Carnegie Mellon University. Such algorithms maintain the most recently accessed files in the client's cache. Older files are removed from the cache in favor of newer files. This technique can be effective provided users work on the same files for the bulk of the file access monitoring period. If the user has a tendency to jump around from task to task, the effectiveness of the LRU technique will be diminished. To address this problem, user's may specify files that should remain "sticky" in the client's disk cache by boosting their priority so that the LRU caching algorithm treats them as most recently used files. To reduce the burden on users, a spy operation may be performed that identifies files accessed over a given time period and creates a suggested list of files that will receive the priority boost. Users may be given an opportunity to edit the file to override the suggestions if they so desire. However, if for some reason a file is not specified, and if that file is not retained in the local computer's disk cache prior to disconnection, the file will not be available following disconnection.

An example of a complex hoarding algorithm is one described by G. Kuenning et al. in their paper entitled "Automated Hoarding for Mobile Computing," $16^{th}$ ACM Symposium on Operating System Principles (1977). This hoarding algorithm is based on a file clustering technique that attempts to assign files to projects, prioritize the projects, and cache files for the highest priority project(s). More particularly, an observer process collects user accesses and feeds them to a correlator. The correlator evaluates the file references and calculates "semantic distances" among various files based on the reference sequence of an individual process. These semantic differences drive a clustering algorithm that assigns each file to one or more projects. When new hoard contents are to be chosen, the correlator examines the projects to find those that are currently active, and selects the highest-priority projects until a maximum hoard size is reached. Only complete projects are hoarded based on the assumption that partial projects are not sufficient to make progress.

Notwithstanding the sophistication of the foregoing complex hoarding technique, subsequent simulation studies by the Kuenning et al. have shown that it is no more effective than a modified form of LRU hoarding in which heuristics are applied to increase performance. G. Kuenning et al., "Simplifying Automated Hoarding Methods," ACM MSWiM, (2002). These heuristics include identifying and ignoring certain programs that access files for scanning purposes only, forcing the hoarding of critically important files such as shared libraries, forcing the hoarding of files that are rarely accessed but necessary for system initialization, and always hoarding non-files such as directories, symbolic links and device files.

It is to improvements in network file caching technology to which the present invention is concerned. What is needed is a simple yet effective technique by which files maintained on one network host can be automatically transferred to another network host in anticipation of subsequent file accesses or subsequent disconnection, thereby allowing the recipient system to be used for continued file access irrespective of network conditions or the originating system's continued availability for access. What is particularly required is a technique that allows such files to be intelligently copied from one host to another with minimal human intervention and with a high likelihood that all required files will be transferred.

SUMMARY OF THE INVENTION

The foregoing problems are solved and an advance in the art is obtained by a method, system and computer program product for enhancing the transfer of files from a source network host to a destination network host. The technique includes accessing a file stored on the source host from the destination host and caching a local copy of the file on the destination host. All remaining files in a file system group of which the file is a member are also prefetched by caching local copies thereof on the destination host.

According to exemplary disclosed embodiments, the file access operation may include opening a file on the source host from the destination host. The caching operation may include creating a copy of the file in a file system on the destination host. The file system group may be one of a file system directory or a file system storage volume. The prefetching may include assigning a priority to the file system group and prefetching the file system group according to its priority relative to the priorities of other file system groups. The priority may be based on an access time of a most recently accessed file in the file system group. The technique may further include removing the file system group from the destination host according to its priority relative to other file system groups cached on the destination host, and in accordance with available caching storage.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 1A:
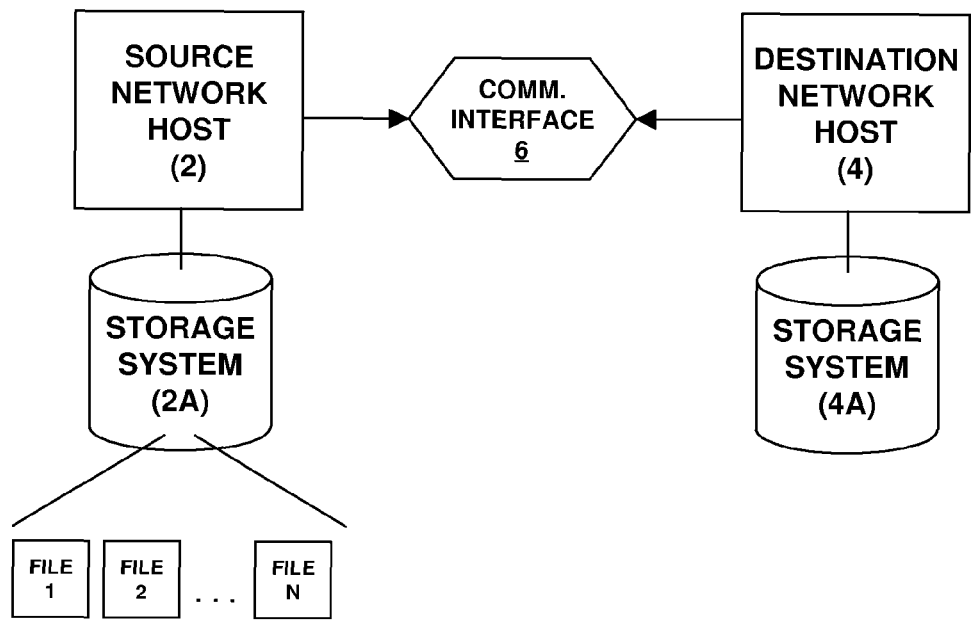
FIG. 1A is a functional block diagram showing a source network host storing files that are need on a destination network host.
Figure 1B:
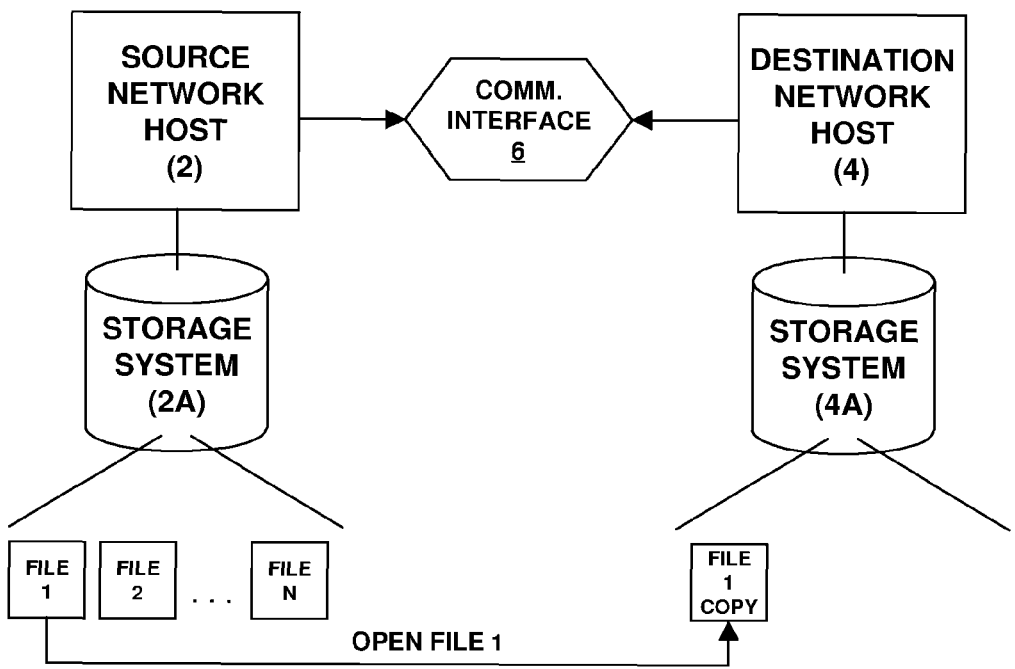
FIG. 1B is a functional block diagram according to FIG. 1 showing the transfer of a first file from the source host to the destination host.
Figure 1C:
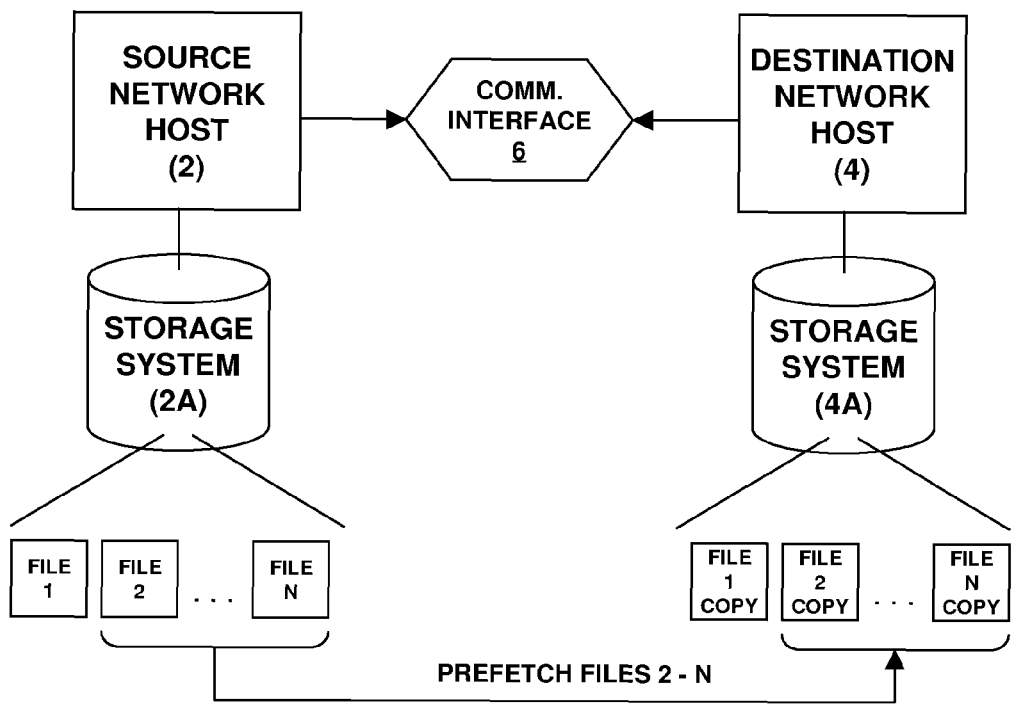
FIG. 1C is a functional block diagram according to FIG. 1 showing the prefetching of a file system group containing the transferred file from the source host to the destination host resulting from the first file transfer in FIG. 1B.

Turning now to drawing figures, wherein like reference numerals indicate like elements in all of the several views, FIGS. 1A-1C illustrate a source network hosts 2 that stores one or more files, labeled as "file 1," "file 2" . . . "file N," on a source data storage system 2A. A destination network host 4 also stores one or more files (not shown) on a destination data storage system 4A. The source network host 2 and the destination network hosts 4 may be implemented using any of a wide variety of computers and other data processing devices. Although not a requirement, the source network host 2 will typically be a non-portable system. Examples include personal desktop computers, workstations, servers, minicomputers, mainframes, or any other general purpose computer. The source network host 2 may also be a dedicated storage manager server that connects to the source data storage system 2A directly or via a network. The source network host 2 could also be a dedicated processing resource within the data storage system 2A itself. The destination network host 4 will typically be a portable device, but again, this is not a requirement. Examples include laptop computers, portable handheld devices such as personal digital assistants (PDAs), cellular telephones, music players, etc.

The two network hosts 2 and 4 are assumed to communicate with each other via an appropriate communication interface 6, such as a wired or wireless network, a direct point-to-point connection (wired or wireless), or otherwise. In some but not necessarily all cases, the communication interface 6 will be temporary, such as a wireless network interface or a wired network with connector cabling that can be unplugged. The source data storage system 2A and the destination data storage system 4A may be provided by any locally or remotely connected storage resource, including one or more drives containing disks, tape, or other suitable information storage media. Although not shown in FIGS. 1A-1C, it will be further understood that the source network host 2 and the destination network host 4 each implement a file system to manage the files stored on their respective storage systems 2A and 4A.

FIG. 1A illustrates an initial processing state of the source and destination network hosts 2 and 4. In this state, it will be assumed that communication has been established between the two systems via the communication interface 6. It is further assumed that the file system on the source data storage system 2A (source file system) has been mounted into the file system on the destination data storage system 4A (destination file system) using conventional network or distributed file system functionality. Block 10 of the flow diagram of FIG. 2 also illustrates this state.

FIG. 1B illustrates a processing state of the source and destination network hosts 2 and 4 wherein a file has been accessed on the source data storage system 2A and a local copy of the file has been made on the destination data storage system 4A. For example, the file labeled "file 1" on the source data storage system 2A can be opened from the destination network host 4. This will result in "file 1" being copied to the destination data storage system 4A and some or all of its contents being buffered into the destination network host's memory. This state is also shown in block 12 of FIG. 2. The action of creating a local copy of "file 1" on the destination data storage system 4A in response to a file access operation such as opening the file is a conventionally supported by existing file system software. The well known "cachefs" facility is one such file system caching mechanism. In an NFS environment, the cachefs facility allows a file system on a remote server that is shared with a local client via NFS to be locally cached by the client. When the client machine attempts to access a file from the remote file system, the file is copied to a locally mounted cache file system (cachefs). Although the initial request to access the file will be at typical NFS speeds, subsequent accesses to the file will be served from the cachefs at local file system speeds. The prior art Coda distributed file system is another file system that provides such caching capability.

FIG. 1C illustrates a processing state wherein additional files are cached based on the file access operation of FIG. 1B. In particular, additional files from the same file system group that contained "file 1" are prefetched on the source data storage system 2A and a local copy thereof is created on the destination data storage system 4A. This state is shown by block 14 in FIG. 2. The file system group and the manner in which its files will be prefetched may be specified in advance as rules by a user of the destination network host 4. Exemplary file system groups and prefetch rules include, but are not limited to, the examples listed below:

1. Prefetch all files in a directory (the file system group) when the directory is opened or a specified number of files in the directory are accessed;
2. Prefetch all files associated with a particular project (the file system group) when the project is opened or a specified number of project files are accessed;
3. Prefetch all files owned by a particular user or group (the file system group) when a specified number of files owned by the user or group are accessed;
4. Prefetch all files with filenames having common filename characters (the file system group), such as the same prefix or suffix, when a specified number of files having the same prefix or suffix in their filenames are accessed.

Figure 2:
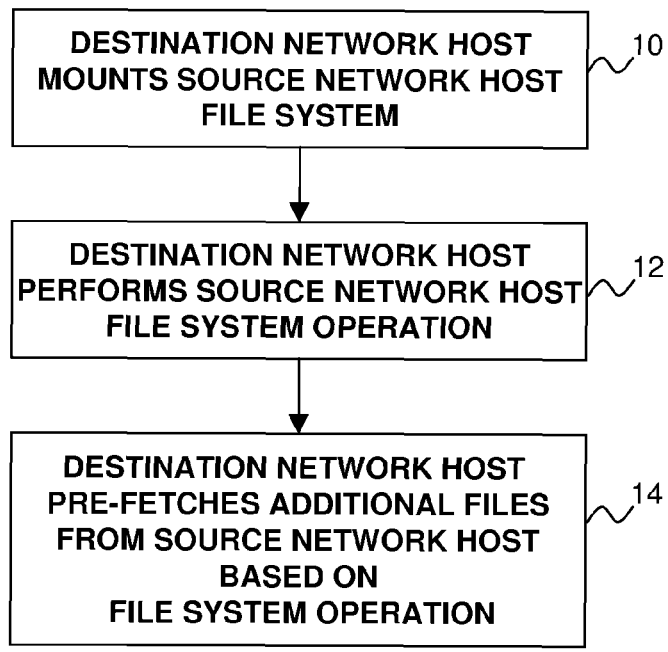
FIG. 2 is a flow diagram showing exemplary operations that may be performed in accordance with FIGS. 1A-1C.
Figure 3:
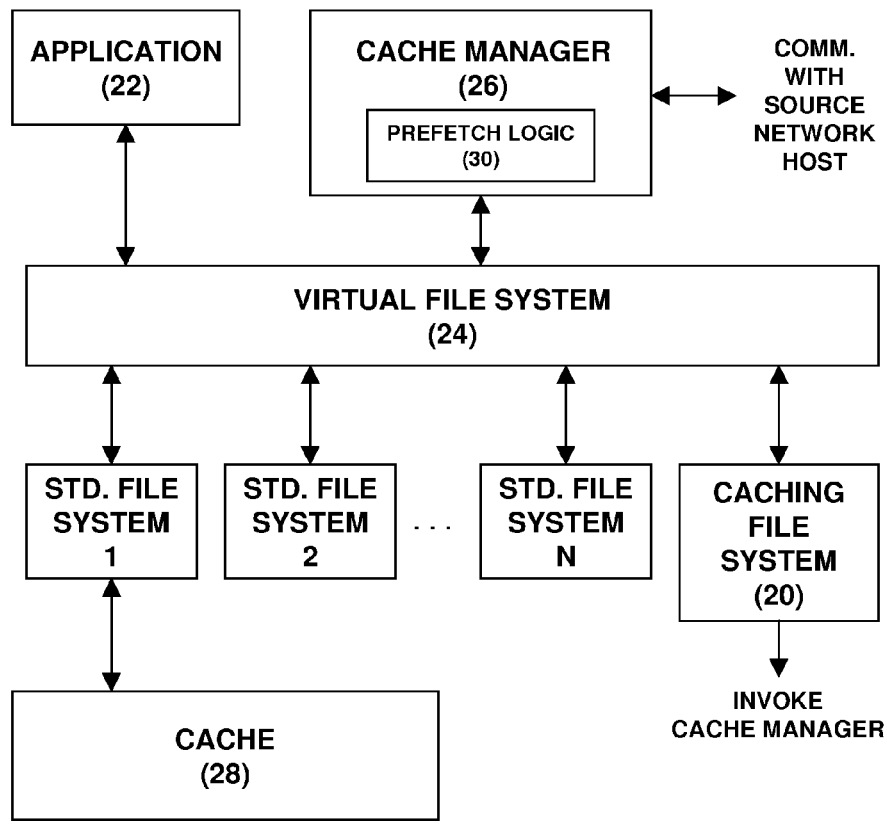
FIG. 3 is a functional block diagram showing an exemplary file system and other components of the destination host of FIGS. 1A-1C.
Figure 4:
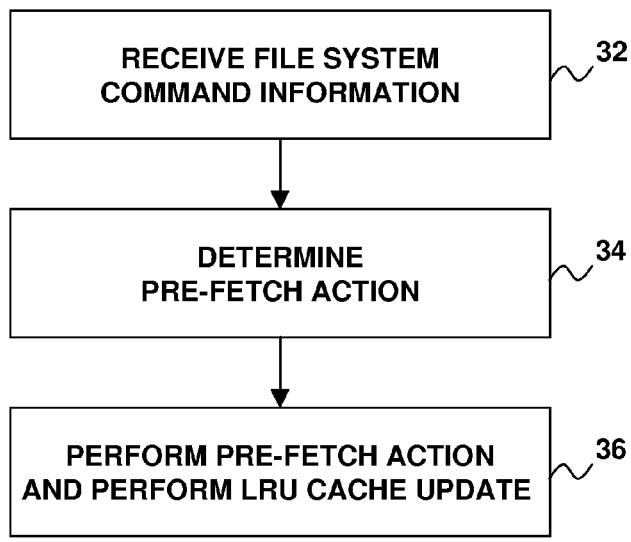
FIG. 4 is a flow diagram showing exemplary operations that may be performed by prefetch logic of the destination host of FIGS. 1A-1C.

FIGS. 3 and 4 illustrate exemplary processing functions that may be performed by the destination network host 4 to implement the state represented by FIG. 1C and block 14 of FIG. 2. In FIG. 3, the destination network host is shown as including a caching file system 20 that manages files on the destination data storage system 4A. The caching file system 20 may either be directly accessible by a calling application, such as the application 22, or it may be accessed indirectly by way of a conventional virtual file system (VFS) 24. In the latter case, the VFS 24 may also provide an interface to other standard files systems, including those labeled as "Std. File System 1," "Std. File System 2" . . . "Std. File System N."

The caching file system 20 may be implemented using file system logic similar to that of the prior art Coda distributed file system, with appropriate modifications being made to provide the pre-fetching capabilities described herein. To that end, the caching file system 20 may be implemented as a kernel module that employs the services of a user space cache manager 26. The cache manager 26 communicates with one or more remote network hosts, such as the source network host 2 of FIGS. 1A-1C. It also maintains a local disk cache 28 for files that are opened on remote network hosts, such as the "file 1" opened in FIG. 1B. As per the conventional operation of the Coda file system, a file open( ) system call issued by the application 22 enters the VFS 24 (if present), where it is passed to the caching file system 20. The caching file system 20 may communicate the request to the cache manager 26 by writing to a character device file that can be read by the cache manager. The cache manager 26 attempts to answer the request by first looking in its cache 28. If the file is not found in the cache 28, the cache manager 26 queries the remote server(s), such as the source network host 2, for the file. If the file is located on a remote server, it is fetched using appropriate remote procedure calls and copied to the cache 28. The file is now an ordinary file on a local disk of the destination network host 4 that may accessed using normal file access operations. At this point, the cache manager 26 reports back to the caching file system 20, which in turn notifies the VFS 24 (if present). The VFS 24 (if present) then returns from the system call back to the application 22. As described thus far, the operations of the caching file system 20 and the cache manager 26 are conventional in nature insofar as they are implemented by the prior art Coda distributed file system.

In addition, however, the cache manager 26 may be modified with prefetch logic 30 in order to perform prefetching in accordance with the present disclosure. In FIG. 4, block 32 represents the cache manager 26 receiving a file request from the caching file system 20. In block 34, the prefetch logic 30 determines a pre-fetch action to be taken based on the prefetch rule(s) specified in advance by a user of the destination network host 4. As described above in the listing of exemplary prefetch rules, prefetching involves caching additional files (e.g., all remaining files) in a file system group following an initial file in the same group being accessed. In block 36, the cache manager 26 fetches the additional files and copies them to the cache 28. Block 36 may further implement an LRU algorithm that removes one or more stale file system groups from the cache 28 if there is insufficient space for a new file system group being added to the cache.

The LRU algorithm is based on the priority of each file system group relative to other file system groups stored in the cache 28. One way to establish priority is to assign an access time to each file system group. The access time of a file system group may be determined in several ways. One technique would be to set the access time as the time when the file system group was first cached. Another technique that considers user activity subsequent to initial caching would be to assign the access time based on the access time of a most recently accessed file in the file system group. Still another technique would be to assign the file system group access time based on the number of open files in the group. Combinations of the foregoing file system group LRU prioritization techniques could also be used.

If desired, an explicit LRU override capability may also be provided. For example, if a file system group that is a candidate for LRU removal from the cache 28 has open files, a message could be generated to advise a user of the destination host 4 that the prefetch logic 30 desires to close the files and remove the corresponding file system group from the cache 28. The message could advise the user that the cache is full and request authorization from the user to close the open files so that the file system group can be removed. A further option would be to allow for adjustment of the size of the cache 28. The user could then be requested to authorize an increase in cache space in lieu of or in addition to being requested to authorize the removal of a file system group from the cache 28.

Figure 5:
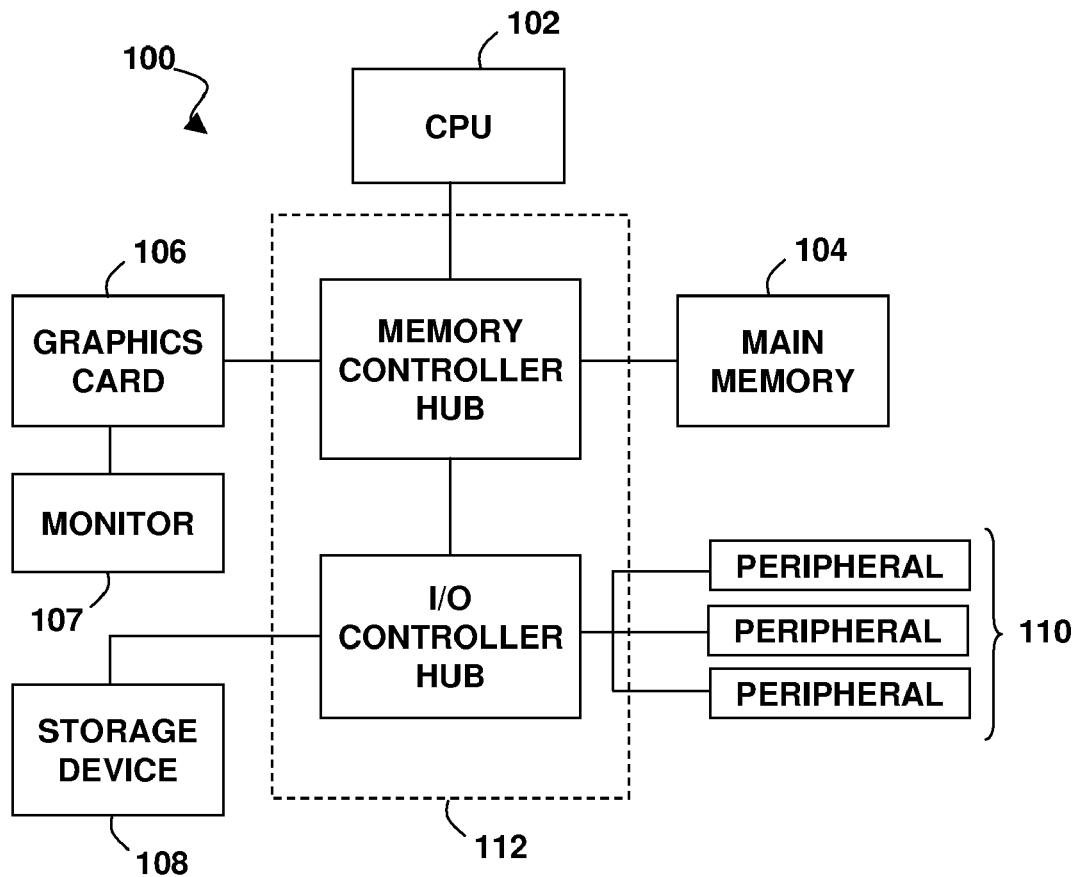
FIG. 5 is a functional block diagram showing exemplary data processing hardware that may be used to implement the destination host of FIGS. 1A-1C.

Accordingly, a technique has been disclosed for enhancing file transfers from a source network host a destination network host. It will be appreciated that the foregoing concepts may be variously embodied in any of a network host, a machine implemented method, and a computer program product in which programming logic is provided by one or more machine-useable media for use in controlling a network host to perform the required functions. Relative to a network host and machine implemented method, FIG. 5 illustrates an exemplary hardware environment 100 that may be used to implement the destination network host 4. The hardware environment 100 includes a CPU or other data processing resource 102 (data processor) and a main memory 104 that provide a data processing core, a graphics card 106 for generating visual output information to a display monitor 107, a peripheral storage device 108, other peripheral devices 110, and a bus infrastructure 112 interconnecting the foregoing elements. The software components of the destination network host 4 may be loaded in the main memory 104. Various I/O (Input/Output) resources may be provided by the peripheral devices 110, which may include a USB bus controller, a SCSI disk controller, and a NIC. The monitor 107 may be implemented as part of a user interface.

Figure 6:
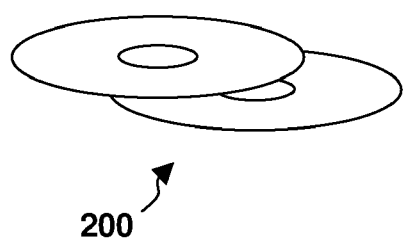
FIG. 6 is a diagrammatic representation of exemplary storage media that may be used in a computer program product implementation of software and/or firmware logic of the destination host of FIGS. 1A-1C.

Relative to a computer program product having a machine-readable media and programming logic, exemplary data storage media for storing the programming logic are shown by reference numeral 200 in FIG. 6. The media 200 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the destination network host 4, either alone or in conjunction with another software product that incorporates the required functionality (e.g., an operating system distribution or file system product). The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation medium (such as a network), or other entity that can contain, store, communicate, propagate or transport the programming logic for use by or in connection with a network host, computer or other instruction execution system, apparatus or device. It will also be appreciated that the invention may be embodied in a combination of hardware logic and software elements, and that the software elements may include but are not limited to firmware, resident software, microcode, etc.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for enhancing the transfer of files from a source network host to a destination network host via a communication interface, comprising:
   accessing a file stored on said source host from said destination host via said communication interface;
   said accessing being initiated by a request to open said file for reading or writing at said destination host as part of a destination host work session involving a file system group that contains said file;
   said destination host copying contents of said file from said source host to said destination host via said communication interface and caching a local copy of said file on said destination host;
   said accessing being completed by opening said cached local copy of said file on said destination host;
   said destination host using prefetch logic to determine what files constitute said file system group; and
   said destination host prefetching all remaining files in said file system group determined by said prefetch logic by copying contents of said remaining files from said source host to said destination host via said communication interface and caching local copies thereof on said destination host so that said remaining files are accessible locally at said destination host for use during said work session.

2. A method in accordance with claim 1, wherein said file access operation comprises said destination host opening said file for modification.

3. A method in accordance with claim 1, wherein said caching includes creating a copy of said file in a file system on said destination host.

4. A method in accordance with claim 1, wherein said file system group is one of a file system directory, a file system storage volume, a project, a user or group, or a set of files with common filename characters.

5. A method in accordance with claim 1, wherein said prefetching includes assigning a priority to said file system group and prefetching said file system group according to said priority relative to priorities of other file system groups.

6. A method in accordance with claim 5, wherein said priority is based on an access time of a most recently accessed file in said file system group.

7. A method in accordance with claim 5, further including removing said file system group from said destination host according to said priority relative to other file system groups cached on said destination host and in accordance with available caching storage.

8. A network host, comprising:
   a data processor;
   a first data storage resource;
   a file system managing files on said first data storage resource;
   a cache manager in communication with said file system, said cache manager being adapted to:
   access a file stored on a second data storage resource via a communication interface;
   said access being initiated by a request to open said file for reading or writing at said network host as part of a network host work session involving a file system group that contains said file;
   initiate copying of contents of said file from said second data storage resource to said network host via said communication interface and cache a local copy of said file on said first data storage resource;
   complete said accessing by enabling said file system to open said cached local copy of said file on said first data storage resource;
   using prefetch logic determine what files constitute said file system group;
   prefetch all remaining files in said file system group determined by said prefetch logic by initiating copying of contents of said remaining files from said second data storage resource to said network host via said communication interface and caching local copies thereof on said first data storage resource so that said remaining files are accessible locally at said network host during said work session.

9. A system in accordance with claim 8, wherein said file access operation comprises opening said file for modification on said second data storage resource.

10. A system in accordance with claim 8, wherein said caching includes creating a copy of said file on said first data storage resource.

11. A system in accordance with claim 8, wherein said file system group is one of a file system directory, a file system storage volume, a project, a user or group, or a set of files with common filename characters.

12. A system in accordance with claim 11, wherein said prefetch includes assigning a priority to said file system group and prefetching said file system group according to said priority relative to priorities of other file system groups, and wherein said file system is further adapted to periodically remove a file system group from said first data storage system based on a priority of said file system group and in accordance with available caching storage.

13. A system in accordance with claim 12, wherein said priority is based on an access time of a most recently accessed file in said file system group.

14. A computer program product, comprising:
   one or more computer useable storage media;
   program logic associated with said computer useable media for programming a data processing platform to enhance the transfer of files from a source network host to a destination network host via a communication interface, as by:

accessing a file stored on said source host from said destination host via said communication interface;

said accessing being initiated by a request to open said file for reading or writing at said destination host as part of a destination host work session involving a file system group that contains said file;

said destination host copying contents of said file from said source host to said destination host via said communication interface and caching a local copy of said file on said destination host;

said accessing being completed by opening said cached local copy of said file on said destination host;

said destination host using prefetch logic to determine what files constitute said file system group; and said destination host prefetching all remaining files in said file system group determined by said prefetch logic by copying contents of said remaining files from said source host to said destination host via said communication interface and caching local copies thereof on said destination host so that said remaining files are accessible locally at said destination host for use during said work session.

15. A computer program product in accordance with claim 14, wherein said file access operation comprises opening said file for modification on said source host from said destination host.

16. A computer program product in accordance with claim 14, wherein said caching includes creating a copy of said file in a file system on said destination host.

17. A computer program product in accordance with claim 14, wherein said file system group is one of a file system directory, a file system storage volume, a project, a user or group, or a set of files with common filename characters.

18. A computer program product in accordance with claim 17, wherein said prefetching includes assigning a priority to said file system group and prefetching said file system group according to said priority relative to priorities of other file system groups.

19. A computer program product in accordance with claim 18, wherein said priority is based on an access time of a most recently accessed file in said file system group.

20. A computer program product in accordance with claim 18, wherein further including removing said file system group from said destination host according to said priority relative to other file system groups cached on said destination host and in accordance with available caching storage.

* * * * *